United States Patent [19]

Sasaki

[11] Patent Number: 4,583,375
[45] Date of Patent: Apr. 22, 1986

[54] COOLING APPARATUS

[75] Inventor: Yoshio Sasaki, Nagasaki, Japan

[73] Assignee: Mitsubishi Denki Kabushiki Kaisha, Tokyo, Japan

[21] Appl. No.: 703,494

[22] Filed: Feb. 20, 1985

[30] Foreign Application Priority Data

Feb. 23, 1984 [JP] Japan .................. 59-34549
Feb. 23, 1984 [JP] Japan .................. 59-34550
Feb. 23, 1984 [JP] Japan .................. 59-34551

[51] Int. Cl.$^4$ ............................................. F25C 5/14
[52] U.S. Cl. ...................................... 62/341; 62/374; 62/380; 62/383; 198/836
[58] Field of Search .............. 62/341, 374, 380, 383; 198/836

[56] References Cited

U.S. PATENT DOCUMENTS

| 3,232,218 | 2/1966 | Soussloff et al. | 62/341 |
| 3,242,684 | 3/1966 | Sola | 62/341 |
| 3,300,994 | 1/1967 | Bagge-Lund | 62/341 |
| 3,302,423 | 2/1967 | Morrison | 62/266 |
| 3,615,720 | 10/1971 | Knutrud | 62/341 |
| 3,832,145 | 8/1974 | Ellithorpe | 23/293 S |
| 4,004,870 | 1/1977 | Guttinger et al. | 62/374 |
| 4,186,797 | 2/1980 | Guttinger | 165/120 |
| 4,236,628 | 12/1980 | Stahura | 198/836 |

FOREIGN PATENT DOCUMENTS 726742 9/1942 Fed. Rep. of Germany ........ 62/341

Primary Examiner—Ronald C. Capossela
Attorney, Agent, or Firm—Oblon, Fisher, Spivak, McClelland & Maier

[57] ABSTRACT

A cooling apparatus for cooling food products to be frozen from their both sides by putting said products between plural, vertically arranged cooling means comprises a rotary conveyor, a cooling means placed below the upper belt of the rotary conveyor and containing a low temperature cooling fluid to thereby cool the upper belt and at least one cooling vessel placed above the rotary conveyor so as to be vertically movable.

8 Claims, 7 Drawing Figures

COOLING APPARATUS

BACKGROUND OF THE INVENTION

The present invention relates to a cooling apparatus for performing rapid cooling or freezing of food products.

There has so far been proposed a cooling apparatus as shown in FIG. 1. In FIG. 1, reference numerals 1 designate food products such as grated meat to be frozen; numerals 2 designate pieces of frozen bread each of which contains the grated meat; numerals 3 designate vertically arranged cooling vessels between which pieces of the frozen bread are put. Each of the cooling vessels 3 is connected at one side to an inlet tube 5 through a flexible tube 4 and is connected at other side to an outlet tube 6 through another flexible tube 4 so that a low temperature cooling fluid 9 flows therethrough without leakage. A loading device 8 is provided on the uppermost cooling vessel 3 to press the pieces of frozen bread 2 between the vertically arranged cooling vessels 3 and a fixed floor 7 so that the food products 2 to be frozen can be effectively cooled by the cooling fluid 9 from the top and the bottom.

The operations of the conventional cooling apparatus will be described.

Pieces of frozen bread 2 filled with food product to be frozen 1 are put between the low temperature cooling vessels 3 by manual operations. Then, the loading device 8 is actuated so that the flexible tubes 4 are deformed to press the frozen bread 2 toward the fixed floor 7 via the cooling vessels 3. Thereafter, the low temperature cooling fluid 9 is fed by a fluid supplier (not shown) to pass through the inlet tube 5, the cooling vessels 3 and an outlet tube 6 in order thereby to cool the food products to be frozen 1. As soon as cooling is completed, the loading operation of the cooling vessels is released and the pieces of frozen bread are taken out by manual operations. And then, the frozen food products 1 is removed from the frozen bread 2 by using a heating device (not shown) to pass the frozen food products to the next step.

The conventional cooling apparatus having the construction as above-mentioned has the following disadvantages:

(1) When the pieces of frozen bread 2 are put in and taken out of the cooling apparatus, much labour is needed.

(2) Since the pieces of frozen bread 2 are put in the cooling apparatus in multistage, there is a great pressure difference between the bread at the upper portion and the bread at the lower portion. Accordingly, for the purpose of preventing deformation of the frozen food products, it is necessary to use the frozen bread having high rigidity. The highly rigid frozen bread constitute thermal resistance whereby cooling performance at the lower surface is inferior.

SUMMARY OF THE INVENTION

It is an object of the present invention to eliminate the disadvantage of the conventional cooling apparatus and to provide a cooling apparatus capable of automatic carrying operations for food products to be frozen to save manual efforts and to increase cooling performance by directly cooling the food products without using the frozen bread.

The foregoing and the other objects of the present invention have been attained by producing a cooling apparatus for cooling food products to be frozen from their both sides by putting the products between plural, vertically arranged cooling means, comprising a rotary conveyor, a cooling means placed below the upper belt of the rotary conveyor and containing a low temperature cooling fluid to thereby cool the upper belt and at least one cooling vessel placed above the rotary conveyor so as to be vertically movable.

DETAILED DESCRIPTION OF THE PREFERRED EMBODIMENTS

Preferred embodiments of the present invention will be described with reference to the drawings.

Figure 1:
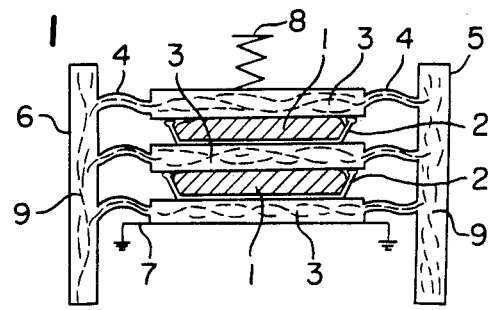
FIG. 1 is a diagrammatical cross-sectional view of a conventional rapid cooling apparatus.
Figure 2:
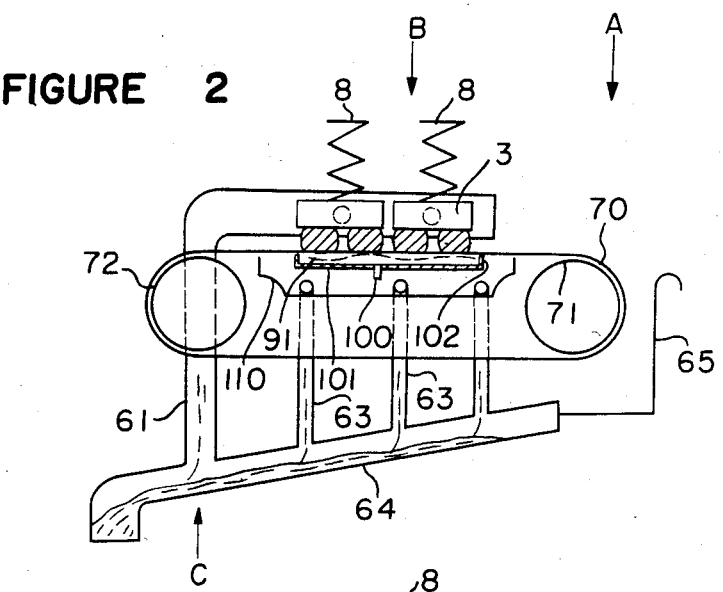
FIG. 2 is a diagrammatical front view partly sectioned of an embodiment of the cooling apparatus according to the present invention.
Figure 3:
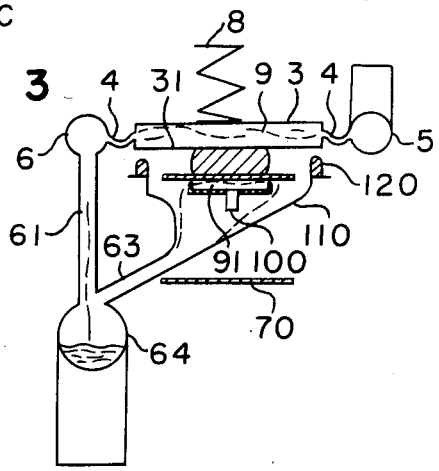
FIG. 3 is a cross-sectional view taken along a line A-B-C in FIG. 2.

FIG. 2 is a diagrammatical front view showing a first embodiment of the present invention and FIG. 3 is a cross-sectional view of FIG. 2.

In the figures, a plurality of low temperature cooling vessels 3 are arranged laterally in a single line but not in vertical arrangement as in the conventional apparatus. Accordingly, a inlet tube 5, an outlet tube 6 and flexible tubes 4 are all arranged horizontally. There are provided a plurality of loading devices 8 corresponding in number to the cooling vessels. Below the cooling vessels 3, there is provided a rotary conveyor 70 whose belt is driven by a driving pulley 72 and driven pulley 71.

A shallow, uncovered container constituted by a bottom surface 101 and a peripheral wall 102 is placed below the upper horizontal run or belt of the rotary conveyor 70. The container is so designed that a low temperature cooling fluid 91 supplied through a conduit 100 formed in the bottom surface 101 overflows beyond the peripheral wall 102. There is provided a fluid receiver 110 for receiving the overflowed cooling fluid below the uncovered container. The fluid receiver 110 has an outlet conduit 63 at the bottom, which is connected to a main pipe 64. An equalizing pipe 65 is connected to the main pipe 64 and a connecting pipe 61 is connected between the outlet tube 6 and the main pipe 64. A stopper 120 is provided at the upper peripheral portion of the fluid receiver 110 to prevent the lower surfaces of the cooling vessels 3 from descending below a predetermined position.

The operation of the rapid cooling apparatus of the present invention will be described.

The food products to be frozen 1 are put on the rotary conveyor 70 and are carried onto the shallow, uncovered container by the operation of the driving pulley 72 and the driven pulley 71. Control of the actuation and stoppage of the pulleys is performed by a known technique. Then the loading devices 8 are actuated to lower the cooling vessels 3 until the lower surfaces 31 of the cooling vessels 3 sufficiently come in contact with the food products to be frozen 1. In this case, the flexible tubes 4 permit smooth movement of the cooling vessels 3.

In the next place, the low temperature cooling fluid 9 is supplied from the inlet tube 5 into the cooling vessels 3 and flows to the main pipe 64 through the outlet tube 6 and the connecting pipe 61 while the food products to be frozen 1 are cooled from the upper part through the lower surfaces 31 of the vessels 3. On the other hand, the low temperature cooling fluid 91 is supplied from the conduit 100 into the shallow, uncovered container and it overflows beyond the peripheral wall 102, during which the food products 1 are cooled from below via the upper belt of the rotary conveyor 70. The cooling fluid 91 overflowed is passed through the fluid receiver 110 and the outlet conduit 63 to the main pipe 64 where it is combined with the cooling fluid 9. The equalizing pipe 65 provides smooth blowing of the cooling fluid. Upon completion of cooling operation, supply of each of the cooling fluids 9, 91 is stopped and the cooling vessels 3 are raised upward followed by operating the rotary conveyor 70 to carry the food products to the next step; thus, a series of cooling steps is finished.

In this embodiment, the main pipe 64 is provided at the lowermost part of the cooling apparatus. However, construction may be made as to the outlet conduit 63 and the connecting pipe 61 being directly connected to the fluid receiver 110 so that each of the cooling fluids 9, 91 can be recovered from the bottom of the fluid receiver 110.

Thus, a plurality cooling vessels are arranged horizontally above and along the rotary conveyor without using a multistage structure of the cooling vessels as in the conventional cooling apparatus, to cool fluid products to be frozen from upper and lower parts. Accordingly, putting the food products in and taking them out of the cooling apparatus can be easy to save labour and cooling effect can be improved because of elimination of the frozen bread.

Figure 4:
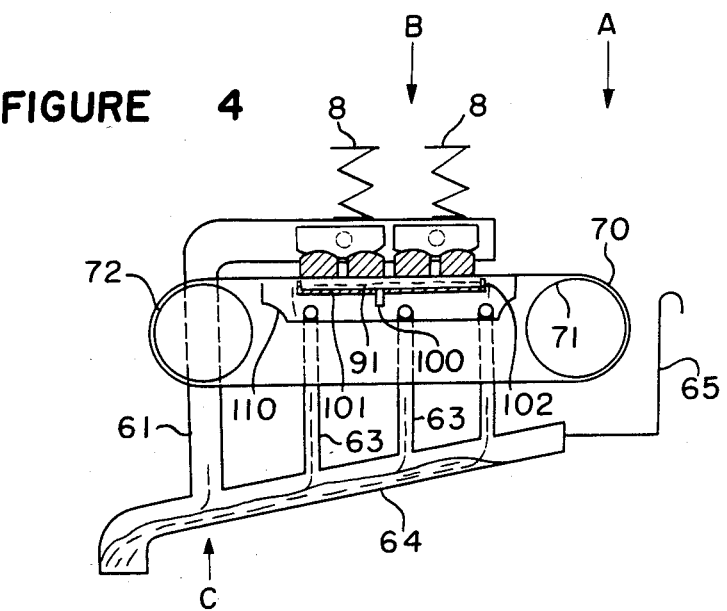
FIG. 4 is a diagrammatical front view partly sectioned of a modified embodiment of the first embodiment of the present invention.
Figure 5:
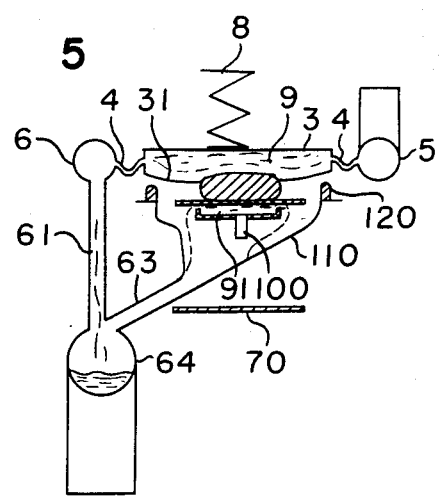
FIG. 5 is a cross-sectional view taken along a line A-B-C in FIG. 4.

FIGS. 4 and 5 show a modified embodiment of the first embodiment. In the figures, each of the lower surfaces 31 of the cooling vessels 3 is made of a flexible sheet material. With the construction, the flexible lower surface 31 can be in close contact with the food products to be frozen in conformity with the shape of the upper part of the products even though there is some unevenness in the shape of the products; thus, cooling effect is improved.

Figure 6:
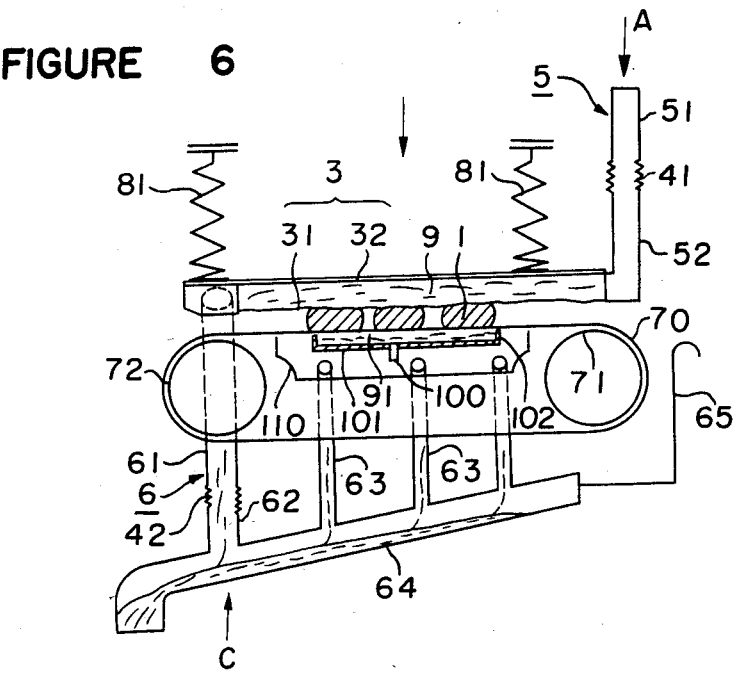
FIG. 6 is a diagrammatical front view partly sectioned of another embodiment of the present invention.
Figure 7:
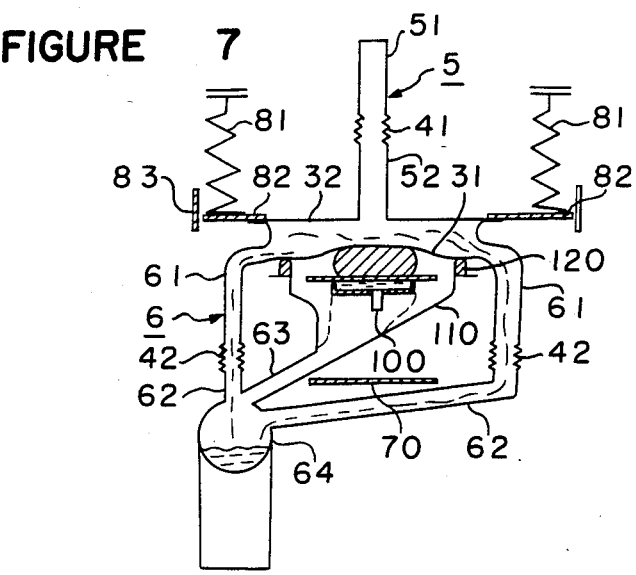
FIG. 7 is a cross-sectional view taken along a line A-B-C in FIG. 6.

FIGS. 6 and 7 show another embodiment of the present invention which is suitable for a large-sized cooling apparatus. In the figures, the same reference numerals as in FIGS. 2-5 designate the same or corresponding parts and therefore description of these parts is omitted.

A single, large sized cooling vessel 3 is placed above and along the longitudinal direction of the rotary conveyor 70 for carrying the food products to be frozen. The cooling vessel 3 has an upper surface 32 and a lower surface 31 made of a flexible sheet material and is so designed as to flow the low temperature cooling fluid 9. At least one inlet tube 5 is connected to one end of the cooling vessel 3. The inlet tube 5 comprises upper and lower parts 51, 52 and a flexible tube portion 41 which is formed at the intermediate portion of the inlet tube 5 and has a inner diameter substantially same as those of the upper and lower parts 51, 52. Outlet tubes 6 are connected to the other end of the cooling vessel 3 and in turn, the other end portions of the outlet tubes 6 are connected to the main pipe 64. Each of the outlet tubes 6 comprises upper and lower parts 61, 62 and a flexible tube portion 42 which is formed at the intermediate portion of the inlet tube 6 and has an inner diameter substantially same as the upper and lower parts 61, 62.

A supporting member 82 is provided at the upper part of the cooling vessel 3. The supporting member 82 helps the vertical movement of the large-sized cooling vessel caused by loading devices 81 as well as serving to restrict of lateral movement of the cooling vessel 3 in association with means for preventing lateral movement 83.

Thus, in this embodiment, a large number of food products to be frozen can be cooled from the upper and lower parts by a single large-sized cooling vessel in addition to the effect as in the previously mentioned embodiments.

Further, in this embodiment, it is possible to use a single supporting member 82 though the supporting member 82 is devided into two parts.

A desired number of the inlet and outlet tubes for flowing the cooling fluid may be used. In addition, the lower surface of the cooling vessel 3 may be made of a material having rigidity as far as the material has a good thermal conductive property, even though the above-mentioned embodiment uses a flexible sheet material, so that the lower surface can be in close contact with the food products to be frozen 1.

I claim:
1. A cooling apparatus for freezing food products, comprising:
a conveyor having at least one horizontal run upon which said food products may be conveyed;
cooling vessel means vertically movably mounted above said horizontal run;
means for moving said cooling vessel means downward into direct contact with said food products on said horizontal run; and
lower cooling means for cooling said horizontal run, said lower cooling means comprising:
(a) a shallow open topped container positioned immediately below said horizontal run, and
(b) means for delivering cooling fluid to the bottom of said container, whereby overflow cooling fluid from said container flows along a bottom surface of said horizontal run for cooling said horizontal run.

2. The cooling apparatus according to claim 1 wherein the bottom of said cooling vessel means is constituted by a flexible sheet material.

3. The cooling apparatus according to claim 2, wherein said horizontal run moves in a transferring direction and said cooling vessel means comprise a single cooling vessel provided so as to extend over the substantially entire length of said horizontal run in said transferring direction.

4. The cooling apparatus according to claim 1 wherein said cooling vessel means comprise a plurality of cooling vessels provided in the longitudinal direction of said horizontal run.

5. The cooling apparatus according to claim 1 wherein said cooling vessel means is connected, via flexible tubes, to an inlet tube communicating with a source of said cooling fluid, and to an outlet tube.

6. The cooling apparatus according to claim 5 including flexible tube portions formed at intermediate portions of said inlet tube and outlet tube.

7. The cooling apparatus according to claim 1 wherein said vessel has an inner portion through which said cooling fluid is passed to establish a cooling effect.

8. The cooling apparatus according to claim 1 wherein said means for moving comprise a loading device operable in such a manner that when said horizontal run does not carry food products to be frozen, said cooling vessel is held at an upper position so that said cooling vessel does not contact said food products and when said horizontal run carries said food products, said cooling vessel is brought into contact with said food products to cool said food products.

* * * * *